UNITED STATES PATENT OFFICE.

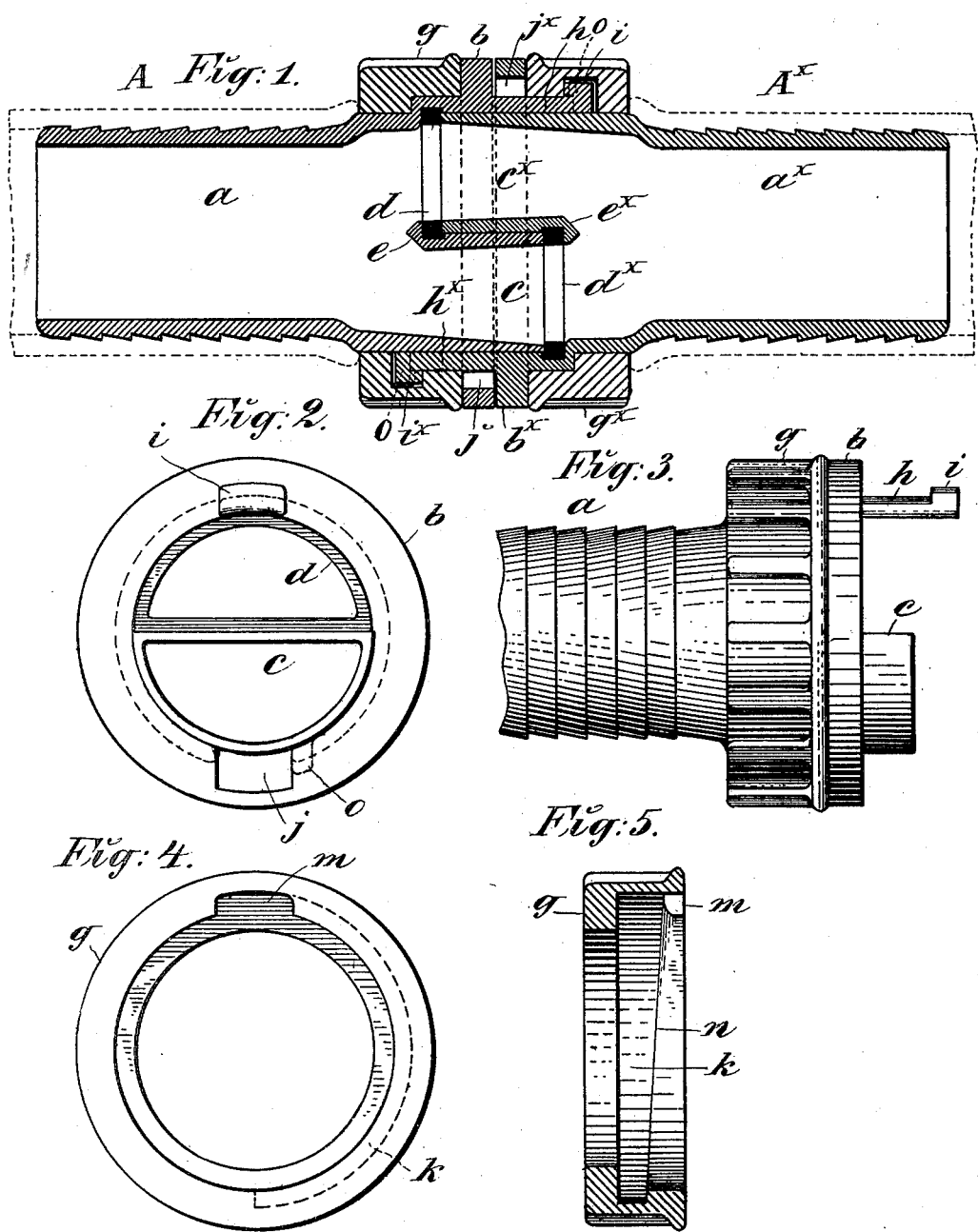

ADELE B. LEES, OF NEW YORK, N. Y., ASSIGNOR OF ONE-HALF TO JOHN R. McCOMB, OF GREAT BARRINGTON, MASSACHUSETTS.

INTERCHANGEABLE COUPLING.

SPECIFICATION forming part of Letters Patent No. 669,090, dated March 5, 1901.

Application filed January 5, 1898. Renewed July 28, 1900. Serial No. 25,143. (No model.)

*To all whom it may concern:*

Be it known that I, ADELE B. LEES, a citizen of the United States, residing in the city, county, and State of New York, have invented certain new and useful Improvements in Interchangeable Couplings, of which the following is a specification.

This invention relates to interchangeable couplings, such as those used for air-brake pipes on cars; and the object is to furnish a coupling in which both members are exactly alike and in which each member has an entering nipple of semicircular cross-section which enters a socket in the other member and bears at its extremity upon a packing-ring at the bottom of the socket. The devices for drawing together and locking the members when the coupling is effected are simple and readily operated.

In the accompanying drawings, which illustrate an embodiment of the invention, Figure 1 is a longitudinal axial section of the coupling. Fig. 2 is an end or face view of one of the members thereof. Fig. 3 is a side elevation of one of said members. Fig. 4 is a face view of one of the locking-rings of the coupling. Fig. 5 is a diametrical section of said locking-ring.

The two members A and $A^\times$ of the coupling are alike, as before stated; but in order that the construction seen in Fig. 1 may be better understood the details of the member $A^\times$ are distinguished from those of the member A by the addition of the character "$\times$" to the reference-letters. Only the member A will be described in detail. This member A comprises a roughened tubular shank $a$ for the attachment of a section of hose or pipe and a head provided with a face-flange $b$ and a nipple $c$, which projects from said face. This nipple is semicircular in cross-section, its flat face being coincident with a diametrical plane passing through the axis of the coupling, as seen in Figs. 2 and 3. When the two coupling members are brought together, the flat faces of the two nipples $c$ and $c^\times$ are applied together, as seen in Fig. 1, and their respective extremities bear upon packing-rings $d^\times$ and $d$, resting on seats formed at the bottoms of sockets in the respective members. Thus the two nipples when applied together form a cylindrical tube, of which the flat walls of the nipples form a sort of diametrical partition. The rings of packing material are semicircular and are retained in place by lateral expansion into circumferential grooves or recesses at their seats. The diametrical portion of the seat is in the form of a V-edged bar, as $e$ and $e^\times$, adapted to offer the minimum of resistance to the flow of fluid through the coupling.

The locking devices of the coupling comprise the following parts: A locking-ring $g$ embraces the member A rotatively exterior to or back of the face-flange $b$ thereon, and on the member $A^\times$ is a fixed locking-lug $h^\times$, which projects from the flange $b^\times$, parallel with the axis of the coupling, said lug having a locking-head $i^\times$. When the two members of the coupling are put together, the lug $h^\times$ passes through an aperture $j$ in the flange $b$ of the member A and enters a circumferential locking-groove $k$ in the ring $g$, the head $i^\times$ entering the groove $k$ by way of a recess $m$, Figs. 4 and 5, cut in the wall of the groove in the ring. When the ring $g$ is rotated about its bearing on the coupling member, the locking-head $i^\times$ engages the wall $n$, Fig. 5, of the groove $k$, and this wall being spirally formed the rotation of the ring serves to draw the two members of the coupling together, as well as lock them.

The parts above described are duplicated, as will be understood, there being a grooved locking-ring $g^\times$ on the member $A^\times$ and a locking-lug $h$ on the member A. In effecting the coupling the operator rotates the two locking-rings $g$ and $g^\times$ simultaneously in opposite directions, and in uncoupling he rotates them simultaneously in the opposite ways. As the locking-lugs $h$ and $h^\times$ will be at exactly opposite sides of the coupling-axis, the two produce a perfectly-alined axial pull in effecting the coupling and hold the parts together evenly and firmly.

In order that the operator may set the locking-rings for coupling properly and without trial—that is, bring the recess $m$ in the ring to register with the aperture $j$ in the flange $b$, so that the locking-stud on the other member may pass through—there may be a detent-stud $o$ on the coupling member, which stud engages the groove $k$ in the ring. The latter can be rotated until the stud $o$ strikes the wall at the end of the groove $k$, and the ring will then turn no farther. The recess $m$ will then register with the aperture $j$.

The advantage of the construction shown, where the tubular nipples are semicircular in cross-section and the flat faces applied one on the other, over known constructions where cylindrical nipples are employed will be obvious. For example, the bore of the coupling is axially alined with the pipe or hose, the cross-section of the coupling is reduced and made symmetrical, and the partition which is opposed edgewise to the flow of the liquid through the coupling is reduced to a minimum in cross-section.

Having thus described my invention, I claim—

1. An interchangeable coupling comprising two like coupling members, each having a projecting tubular nipple of semicircular cross-section, its flat face coinciding with the diameter of the coupling, the passage through said nipples forming parts of the passage for the fluid through the coupling, and locking mechanism for locking the two members together in effecting the coupling, substantially as set forth.

2. An interchangeable coupling comprising two like coupling members, each having a projecting tubular nipple of semicircular cross-section, its flat face coinciding with the diameter of the coupling, and packing-rings at the bottoms of the sockets in the members for the ends of the respective nipples to impinge upon, the passages through said nipples forming parts of the passage for the fluid through the coupling, and locking mechanism for locking the two members together in effecting the coupling, substantially as set forth.

3. An interchangeable coupling composed of two like members each of which consists of the following parts and instrumentalities; a shank $a$ to receive a pipe or hose, a chambered head having a face-flange $b$, with an aperture $j$, a locking-lug $h$ projecting from said flange parallel with the coupling-axis and furnished with a head $i$, a locking-ring $g$, rotatively mounted on the head back of the face-flange and having in it a locking-groove $k$ and a recess $m$ whereby the locking-lug may enter said groove, a tubular nipple $c$, of semicircular cross-section, adapted to enter the other member when the members are fitted together, and a packing-ring $d$ at the bottom of the socket upon which the end of the nipple of the other member impinges, substantially as set forth.

4. A coupling composed of two like members which have each a tubular nipple of semicircular cross-section, the two nipples having their flat faces applied one on the other and the nipple of one member fitting into a socket in the other member, seats and packing-rings at the bottoms of the respective sockets on which the extremities of said nipples impinge, and means for drawing and locking the two members together, substantially as set forth.

5. A coupling composed of two like members which have each a tubular nipple of semicircular cross-section, the two nipples having their flat faces applied one on the other and the nipple of one member fitting into a socket in the other member, packing for the coupling, and means for drawing and locking the two members together, said means comprising locking-rings rotatively mounted on the coupling members concentrically with the axis thereof, the said rings each having in it a locking-groove $k$ to receive a locking-lug $h$ on the other member, substantially as set forth.

In witness whereof I have hereunto signed my name, this 3d day of January, 1898, in the presence of two subscribing witnesses.

ADELE B. LEES.

Witnesses:
HENRY CONNETT,
PETER A. ROSS.